United States Patent [19]

Nye

[11] Patent Number: 5,145,939
[45] Date of Patent: Sep. 8, 1992

[54] DIHYDROXY-META-TERPHENYL POLYCARBONATE

[75] Inventor: Susan A. Nye, Feura Bush, N.Y.

[73] Assignee: General Electric Company, Schenectady, N.Y.

[21] Appl. No.: 731,603

[22] Filed: Jul. 17, 1991

[51] Int. Cl.$^5$ .............................................. C08G 64/04
[52] U.S. Cl. ..................................... 528/196; 528/125; 528/171; 528/174; 528/204
[58] Field of Search ............... 528/196, 204, 125, 171, 528/174

[56] References Cited

PUBLICATIONS

Article–Journal of Polymer Science: Polymer Chemistry Edition, vol. 12, pp. 2357–2367 (1974)–Synthesis and Properties of Phosphorus Containing Polycarbonates, Shizunobu Hashimoto, Isao Furukawa and Teruhiko Kondo.

Article–Macromolecules, vol. 23, No. 10, pp. 2656–2661 (1990)–Polymers of Carbonic Acid. 3. Thermotropic Polycarbonates Derived from 4,4'–Dihydroxybiphenyl and Various Diphenols, Hans R. Kricheldorf and Dirk Lübbers.

*Primary Examiner*—Harold D. Anderson
*Attorney, Agent, or Firm*—William A. Teoli; James C. Davis, Jr.; William H. Pittman

[57] ABSTRACT

Dihydroxy-meta-terphenyl polycarbonates are provided having improved solvent resistance. Alternating and random polycarbonate copolymers resulting from interfacial and single phase organic solvent polymerization techniques with coreactants such as bisphenol A also are provided.

3 Claims, No Drawings

DIHYDROXY-META-TERPHENYL POLYCARBONATE

CROSS REFERENCE TO RELATED APPLICATIONS

Reference is made to copending application Ser. No. 07/731,228, filed concurrently herewith, and copending application Ser. No. 07/651,171, filed Jan. 31, 1991.

BACKGROUND OF THE INVENTION

The present invention relates to aromatic polycarbonates having chemically combined carbonate units derived from the polymerization of dihydroxy-meta-terphenyl. More particularly, the present invention relates to solvent resistant polycarbonate copolymers having chemically combined dihydroxy-meta-terphenyl carbonate units and carbonate units derived from a different biphenol such as bisphenol A.

Prior to the present invention, aromatic polycarbonates were often obtained by reacting 2,2-bis-(4-hydroxyphenyl)propane or "bisphenol A" and were utilized in a variety of applications requiring impact resistance. A preferred procedure for making polycarbonates, particularly polycarbonates having controlled molecular weight, is by the employment of a bisphenol bischloroformate, as shown by U.S. Pat. No. 4,973,664 which is incorporated herein by reference. Another procedure for making aromatic polycarbonates are shown by D. J. Brunelle, U.S. Pat. No. 4,363,905 employing bis(2-nitrophenyl)carbonate in solution with aromatic diols to effect a carbonate exchange reaction A third method is by treatment of aromatic diols with phosgene in the presence of an amine catalyst.

Although aromatic polycarbonates are often recognized for their high impact properties and transparent film forming characteristics, they often suffer from a lack of solvent resistance due to their solubility in a variety of organic solvents. It would be desirable therefore to provide film forming aromatic polycarbonates having improved solvent resistance.

SUMMARY OF THE INVENTION

The present invention is based on the discovery that dihydroxy-meta-terphenyl having the formula,

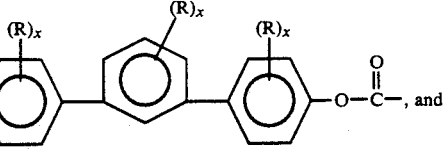

where R can be the same or different monovalent radical and a member selected from the class consisting of nitro, $C_{(1-8)}$ alkoxy and $C_{(1-13)}$ monovalent hydrocarbon and x is a whole number equal to 0 to 4 inclusive can be converted to aromatic polycarbonates and aromatic polycarbonate copolymers utilizing the aforementioned bischloroformate, bis(2-nitrophenyl)carbonate, or phosgenation procedures to produce film forming products exhibiting enhanced solvent resistance.

STATEMENT OF THE INVENTION

There is provided by the present invention, aromatic polycarbonates comprising, (A) from 25 to 100 mol % of random or alternating meta-terphenyl carbonate units having the formula,

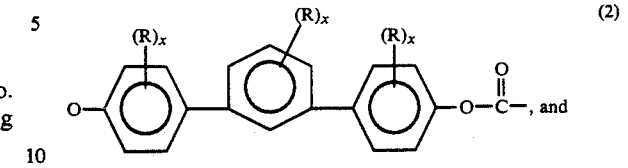

(B) from 0 to 75 mol % of diaryl carbonate units of the formula,

based on the total moles of (A) and (B), where R and x are as previously defined and Q is a divalent $C_{(6-30)}$ aromatic organic radical. Q is more particularly a member selected from the class consisting of

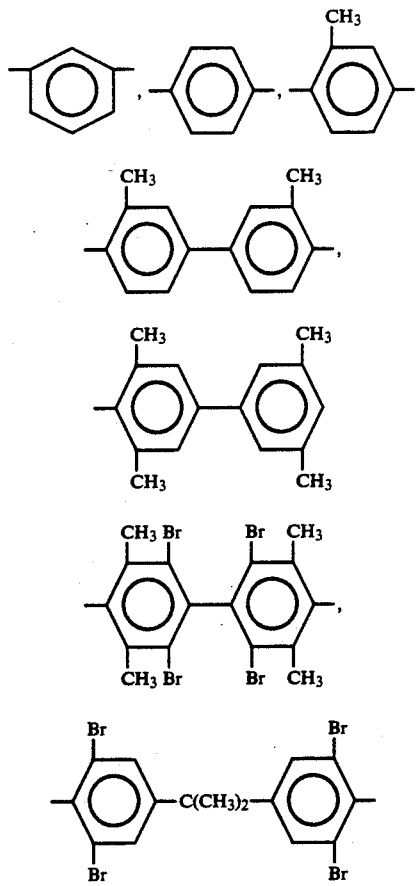

and divalent organic radicals of the general formula,

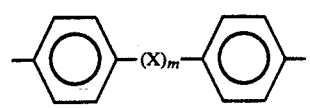

where X is a member selected from the class consisting of divalent radicals of the formula,

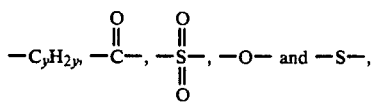

m is 0 or 1 and y is an integer equal to 1 to 4 inclusive.

Some of the aromatic dihydroxy compounds which can be copolymerized with the dihydroxy-meta-terphenyl of formula (1) are for example,
2,2-bis(2-hydroxyphenyl)propane
2,4'-dihydroxydiphenylmethane,bis(2-hydroxydiphenyl)methane
2,2-bis(4-hydroxyphenyl)propane, hereinafter identified as "bisphenol-A" or "BPA"
1,1-bis(4-hydroxyphenyl)ethane,
1,1-bis(4-hydroxyphenyl)propane,
2,2-bis(4-hydroxyphenyl)pentane,
3,3-bis(4-hydroxyphenyl)pentane,
4,4'-dihydroxybiphenyl,
4,4'-dihydroxy3,3,5,5'-tetramethylbiphenyl,
2,4'-dihydroxybenzophenone,
4,4'-dihydroxydiphenylsulfone,
2,4'-dihydroxydiphenylsulfone
4,4'-dihydroxydiphenylsulfoxide,
4.4'-dihydroxydiphenylsulfide, hydroquinone, resorcinol,
3,4'-dihydroxydiphenylmethane,
4,4'-dihydroxybenzophenone, and
4,4'-dihydroxydiphenylether.

In the practice of the present invention, polycarbonates, including alternating copolymers of meta-terphenyl-carbonate units of formula (2) and diaryl carbonate units of formula (3) can be made by an interfacial reaction between bischloroformate and an aromatic diol of formula (1) or a mixture thereof with an aromatic dihydroxy compound such as bisphenol A. A typical interfacial reaction is described in U.S. Pat. No. 4,973,664. High molecular weight alternating copolymers can be obtained which are clear and tough.

Random meta-terphenyl-carbonate copolymers also can be synthesized in solution with a mixture of the dihydroxy-meta-terphenyl of formula (1) and a dihydroxy compound such as bisphenol A, utilizing bis(2-nitrophenyl)carbonate. Copolymers having 85 mol % or less of meta-terphenyl-carbonate units can be made when methylene chloride is used as a solvent. It has been found that substituting tetrachloroethane as a solvent can provide polymers of higher molecular weight. For example, at the 50 mol % level of meta-terphenyl-carbonate units and bisphenol A carbonate units, copolymers can be made at various molecular weights by changing the stoichiometry of the reactants.

The following examples are given by way of illustration and not by way of limitation. All parts are by weight.

EXAMPLE 1

A solution of 2.562 g (9.77 mmol) of dihydroxy-meta-terphenyl, 20 mL (19.54 mmol) of a 0.977N aqueous sodium hydroxide solution and 60 mL of water was stirred in a blender on a low speed for 20 minutes. There was added to the mixture 40 mg (0.014 mmol) of sodium dodecyl sulfate and mg (0.08 mmol) of benzyltriethylamnonium chloride and the resulting mixture was stirred for an additional 5 minutes. There was then added to the mixture a solution of 3.451 g (9.77 mmol) of bisphenol A -bischloroformate dissolved in 75 mL of dichloroethane and the stirring of the resulting mixture was increased to a moderately fast speed for 60 minutes. There was then added 100 mL of methanol to effect precipitation of product. The precipitate was filtered and redissolved in chloroform and reprecipitated into methanol, filtered and dried in vacuo at 150° C. for 15 hours. There was obtained a 76-83% yield of product. Based on method of preparation the product was a polycarbonate consisting essentially of equal molar amounts of meta-terphenyl carbonate units and bisphenol A carbonate units which were alternately combined.

EXAMPLE 2

A mixture of 1.302 g (4.965 mmol) of dihydroxy-meta-terphenyl, 1.518 g (4.990 mmol) of bis(2-nitrophenyl)carbonate, 0.05 mmol of phenol and 20 mL of tetrachloroethane was stirred under nitrogen for 1 hour. There was added to the mixture, 10 mg (0.082 mmol) of dimethylaminopyridine and an immediate yellow color formed resulting in the formation of 2-nitrophenol. The mixture was stirred at room temperature for 12 hours and a viscous, yellow, translucent solution was formed. The mixture was added to a blender containing methanol to effect the precipitation of a powder which was filtered and resuspended in tetrachloroethane, reprecipitated into methanol, filtered and dried in vacuo at 150° C. for 15 hours. There was obtained a yield of 85-96% of product which was a polycarbonate consisting essentially of dihydroxy-meta-terphenyl carbonate units based on method of preparation.

EXAMPLE 3

Phosgene was delivered at a rate of 0.30 g/min. 6.5 min. into a mixture adjusted to a pH of between 10-11 consisting of 3.58 g (13.65 mmol) of dihydroxy-meta-terphenyl and 0.55 g (2.41 mmol) bisphenol A, 49.4 mg (0.131 mmol) of 4-t-butylphenol, 33 mL of tetrachloroethane, 0.035 mL of triethylamine and 65 mL of water in a 50% aqueous solution of sodium hydroxide. The delivery of the phosgene was continued while the pH range of 10-11 was maintained with the addition of drops of sodium hydroxide solution. At the end of the phosgene delivery, the mixture was sparged with nitrogen for an addition 5 minutes. The organic phase was separated from the aqueous phase, washed with 1.0N HCl, 0.1N HCl and water. The product was precipitated from the organic phase by pouring the mixture into a blender of methanol. There was obtained a white powder which was redissolved in chloroform and precipitated again in methanol. The product was dried in vacuo for 15 hours at 100° C. There was obtained a 56-94% yield of a polycarbonate copolymer consisting essentially of dihydroxy-meta-terphenyl carbonate units and bisphenol A carbonate units.

EXAMPLE 4

Additional polymers and copolymers were made following the procedures of example (1), (2) and (3). The various polymers and copolymers were analyzed by differential scanning calorimetry using a Perkin Elmer DSC-7 and the heating rates were 1st and 2nd heats 100°-300° C. at 20° C./min. Thermal gravimetric analysis were also made using a DuPont 9900. The solubility of the polymers were tested by immersing the polymers in a solvent at room temperature and observing the behavior for 20 to 24 hours. The following results were obtained, where % DHmTP is mole % dihydroxy-meta-terphenyl:

| % DHmTP | Type[1] | IV[2] | $M_w$ | Melt flow[3] (g/10 min) | $T_g$[4] | $T_d$[5] |
|---|---|---|---|---|---|---|
| 0 | IPP | 0.54 | 53,500 | 10.4 | | 475° C. |
| 0 | BCF | 0.76 | 126,630 | | 151° C. | |
| 25 | BCF | 1.34 | 157,000 | — | 167° C. | 200° C. |
| 25 | BCF | | 40,800 | 11.8 | 156° C. | 465° C. |
| 50 | BCF | 0.33 | 24,500 | 8.52 | 158° C. | 435° C. |
| 50 | BCF | 0.49 | 40,240 | 3.61 | 166° C. | |
| 50 | BCF | 1.00 | 187,800 | 0.37 | 172° C. | 410° C. |
| 50 | NPC | 0.25 | 18,700 | | 149° C. | 415° C. |
| 50 | NPC | 0.42 | 31,600 | 4.44 | 159° C. | 445° C. |
| 50 | IPP | .94 | 139,500 | | 166° C. | |
| 75 | NPC | | 75,800 | | 173° C. | |
| 75 | IPP | .57 | 173,700 | | 168° C. | |
| 85 | NPC | | 62,650 | | 177° C. | 460° C. |
| 85 | NPC | .72 | 60,150 | | 175° C. | |
| 85 | IPP | | 68,850 | | 175° C. | |
| 85 | IPP | .66 | 60,000 | | 173° C. | |
| 90 | NPC | | 36,900 | | 167° C. ($T_m$ = 268° C.) | |
| 90 | NPC | | 40,600 | | 171° C. ($T_m$ = 259° C.) | |
| 100 | NPC | | 37,900 | | — | |
| 100 | NPC | | 36,850 | | 176° C. ($T_m$ = 274° C.) | 470° C. |
| 100 | NPC | | 48,600 | | 182° C. ($T_m$ = 276° C.) | |
| 100 | NPC | | 54,500 | | 184° C. ($T_m$ = 278° C.) | |

[1] BCF = BPA-bischloroformate; NPC = ortho-Nitrophenyl carbonate; IPP = interfacial phosgenation
[2] dl/gram
[3] melt flow at 300° C. with a 1.2 kg load
[4] °C. by DSC
[5] 5 wt % loss in nitrogen The solubilities and film quality of the polycarbonates were also evaluated and the following results were obtained:

| DHmTP/BPA | $CHCl_3$ | $CH_2Cl_2$ | THF | Toluene | oDCB | DMF | Film Quality |
|---|---|---|---|---|---|---|---|
| 0/100 | yes | yes | yes | yes | no | no | clear, tough |
| 25/75 | yes | yes | n.t.[a] | yes | yes | yes | clear, tough |
| 50/50 | part. | part. | yes | no | yes | yes | clear, tough |
| 75/25 | no | no | part. | n.t.[a] | no | part. | clear, tough |
| 85/15 | n.t.[a] | n.t.[a] | no | n.t.[a] | n.t.[a] | no | clear, tough |
| 90/10 | n.t.[a] | n.t.[a] | n.t.[a] | n.t.[a] | n.t.[a] | n.t.[a] | cloudy |
| 100/0 | no | no | no | no | no | no | cloudy |

[a] Not tested

Although the above examples are directed to only a few of the very many variables which can be utilized in the practice of the present invention, it should be understood that the present invention is directed to a much broader variety of dihydroxy-meta-terphenyl polycarbonates and copolymers thereof as shown in the description preceding these examples.

What is claimed is:

1. An aromatic polycarbonate consisting essentially of,
   (A) from 25 to 100 mol % of random or alternating meta-terphenyl carbonate units having the formula,

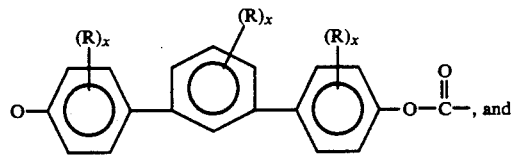

and
   (B) from 0 to 75 mol % of diaryl carbonate units of the formula,

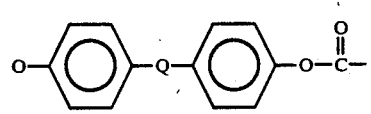

based on the total moles of (A) plus (B), where R is the same or different monovalent radical and a member selected from the class consisting of nitro, $C_{(1-8)}$ alkoxy and $C_{(1-13)}$ monovalent hydrocarbon, x is a whole number equal to 0 to 4 inclusive, and Q is a divalent $C_{(6-30)}$ aromatic organic radical.

2. An aromatic polycarbonate copolymer in accordance with claim 1, where Q is

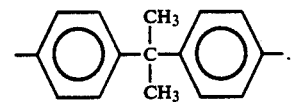

3. An aromatic polycarbonate copolymer in accordance with claim 1, consisting essentially of meta-terphenyl-carbonate units.

* * * * *